(12) United States Patent
Catterson

(10) Patent No.: US 12,284,309 B2
(45) Date of Patent: Apr. 22, 2025

(54) HEADSET SYSTEM FOR ESTABLISHING A CALL SESSION

(71) Applicant: PECLET LIMITED, St. Helier (JE)

(72) Inventor: Stephen Catterson, St. Helier (JE)

(73) Assignee: PECLET LIMITED, St. Helier (JE)

( * ) Notice: Subject to any disclaimer, the term of this patent is extended or adjusted under 35 U.S.C. 154(b) by 422 days.

(21) Appl. No.: 17/627,487

(22) PCT Filed: Jul. 16, 2020

(86) PCT No.: PCT/GB2020/051709
§ 371 (c)(1),
(2) Date: Jan. 14, 2022

(87) PCT Pub. No.: WO2021/009513
PCT Pub. Date: Jan. 21, 2021

(65) Prior Publication Data
US 2022/0256029 A1    Aug. 11, 2022

(30) Foreign Application Priority Data

Jul. 16, 2019 (GB) .................................... 1910151
Jul. 18, 2019 (GB) .................................... 1910320

(51) Int. Cl.
*H04M 1/72409* (2021.01)
*A42B 3/30* (2006.01)
(Continued)

(52) U.S. Cl.
CPC ......... *H04M 1/724097* (2022.02); *A42B 3/30* (2013.01); *G10L 15/22* (2013.01);
(Continued)

(58) Field of Classification Search
CPC ..... A42B 3/30; G10L 15/22; G10L 2015/223; H04B 1/385; H04M 1/6033–6091;
(Continued)

(56) References Cited

U.S. PATENT DOCUMENTS

2010/0203900 A1* 8/2010 Khokhlov .............. G06Q 10/06
455/456.2
2014/0193020 A1* 7/2014 Krissman ............. H04R 1/1008
381/376
(Continued)

FOREIGN PATENT DOCUMENTS

EP         2216737 A1    8/2010
WO    2016210007 A1   12/2016

OTHER PUBLICATIONS

International Search Report, dated Oct. 23, 2020, issued in International Application No. PCT/GB2020/051709.

*Primary Examiner* — Ronald Eisner
(74) *Attorney, Agent, or Firm* — Saul Ewing LLP

(57) ABSTRACT

There is provided a headset system for establishing a call session between a selected plurality of users. The headset system comprises a pair of headphones worn by an end-user, and providing audio features for the user, the pair of headphones shaped to substantially fit inside a helmet. The headset system also comprises a companion application running on the end-user's connected device and connected to the pair of headphones, in which the companion application is used for setting up a group consisting of a selected plurality of users; in which the end-user, via a single user input, is able to establish a call session through the connected device between the selected plurality of users without having to take the helmet off and without handling the connected device.

47 Claims, 12 Drawing Sheets

(51) Int. Cl.
*G10L 15/22* (2006.01)
*H04M 1/60* (2006.01)
*H04M 1/72457* (2021.01)
*H04R 1/10* (2006.01)

(52) U.S. Cl.
CPC ..... *H04M 1/6066* (2013.01); *H04M 1/72457* (2021.01); *H04R 1/1033* (2013.01); *H04R 1/1041* (2013.01); *G10L 2015/223* (2013.01)

(58) Field of Classification Search
CPC ............ H04M 1/72409–72412; H04M 1/72448–72457; H04M 2250/62; H04R 1/1033; H04R 1/1041; H04R 2201/107; H04W 4/02–14; H04W 4/21; H04W 4/80; H04W 76/40–50
See application file for complete search history.

(56) References Cited

U.S. PATENT DOCUMENTS

| | | | | |
|---|---|---|---|---|
| 2016/0057265 A1* | 2/2016 | Gibbons | ............... | H04R 3/04 455/557 |
| 2016/0373583 A1* | 12/2016 | Celinski | ............... | H04M 3/568 |
| 2018/0124225 A1* | 5/2018 | Boesen | ............... | G06F 3/012 |

* cited by examiner

HEADSET SYSTEM FOR ESTABLISHING A CALL SESSION

CROSS REFERENCE TO RELATED APPLICATIONS

This application claims the priority of International Application No. PCT/GB2020/051709, filed on Jul. 16, 2020, which claims priority to GB Application No. 1910151.8, filed on Jul. 16, 2019, and GB Application No. 1910320.9, filed on Jul. 18, 2019, the entire contents of which are fully incorporated herein by reference.

BACKGROUND OF THE INVENTION

1. Field of the Invention

The field of the invention relates to a headset system enabling a user to communicate with group members. More particularly, the headset system may be used in combination with an outdoor sports helmet.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Prior Art

Communicating while performing outdoor activities can bring a number of challenges. It is easy to get separated from friends or group members and sometimes difficult to find them again. However communicating with friends, while skiing for example, is important not only for better enjoyment of the activity but also for safety reasons.

Two-way radios may be used for outdoor activities, however range, weight and battery life can be a problem. They can also be difficult to operate while wearing a helmet and/or gloves.

Sports activities, such as cycling, skiing or skateboarding, are now often required to be done while wearing helmets for protection. A number of helmets or protective head gear provide integral or removable headsets that are attached to the interior of the helmets. However there is still a need to easily communicate with group members. In addition, people also enjoy listening to music while performing an outdoor activity and it can be a challenge to operate both a media player and a mobile device while engaging in outdoor activities.

The present invention addresses the above vulnerabilities and also other problems not described above.

SUMMARY OF THE INVENTION

There is provided a headset system for establishing a call session between a selected plurality of users. The headset system comprises a pair of headphones worn by an end-user, and providing audio features for the end-user, the pair of headphones shaped to substantially fit inside a helmet, and a companion application running on a connected device and connected to the pair of headphones, in which the companion application is configured to set up a group consisting of a selected plurality of users. The end-user, via a single user input, is able to establish a call session through the connected device between the selected plurality of users without having to take the helmet off and without handling the connected device.

BRIEF DESCRIPTION OF THE FIGURES

Aspects of the invention will now be described, by way of example(s), with reference to the following Figures, which each show features of the invention.

DETAILED DESCRIPTION

Figure 1:
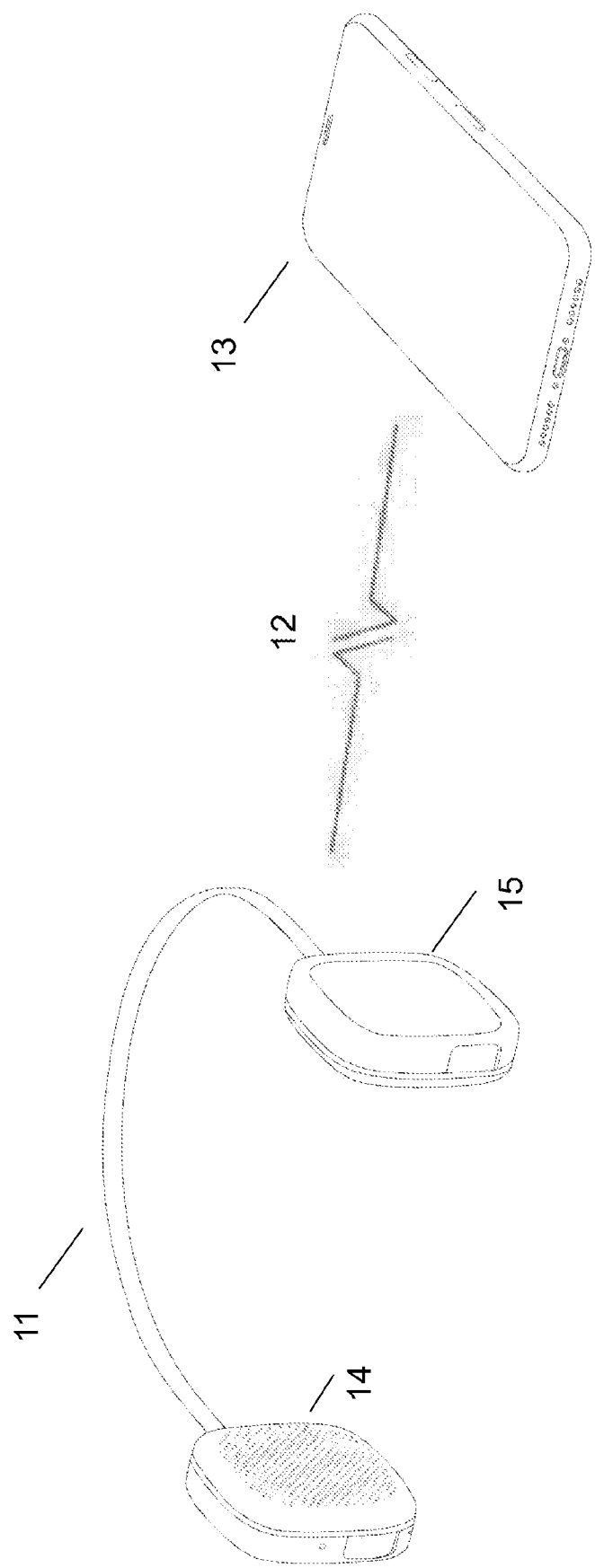
FIG. 1 shows a headset system.

As shown in the drawings for purposes of illustration, the invention relates to a headset system combining audio and communication features.

The headset is configured for inserting into a sports helmet or head gear, such as, but not limited to, bicycle, roller skating, skateboarding, snow boarding or skiing helmet.

The headset system enables an end-user to establish a call session between a selected plurality of users. The headset system includes a pair of headphones (as shown in FIG. 1) that wirelessly connects to a connected device, such as a smartphone. The pair of headphones is worn by an end-user and provides audio features for the end-user. A companion application running on the connected device is configured to setup a group consisting of a selected plurality of users. The end-user is then able to establish a call session between the selected plurality of users without having to take the helmet off and without handling the connected device.

The call session may be established through the connected device using any available communication features, such as cloud-based communication features, or it may also be established using mesh Bluetooth® or Frequency Modulation (FM) communication features. The headset may then comprise a number of communication modules such as Bluetooth®, mesh Bluetooth® or FM module.

FIG. 1 shows a headset system including a headset (11) comprising a pair of headphones, called the Aleck 006™ headset, which connects via wireless communication (12) to a companion application running on the user's smartphone (13). Wireless communication may be implemented using various wired and/or wireless protocols, such as Bluetooth®. The headset system is also waterproof.

As an example, the headset system includes Bluetooth® enabled headphones and can connect wirelessly to any Bluetooth® compatible audio source such as a smartphone, laptop, tablet, smart watch, smart ring or any other personal device.

The headset may include any combination of microphones and speakers apparatus.

The pair of headphones are housed in individual enclosures (14, 15). All of the key componentry i.e. buttons, battery, any communication modules, such as Bluetooth®, mesh Bluetooth® or FM module etc. may all be housed within these enclosures. The enclosures may be made of plastic and may also have metal features.

Figure 2:
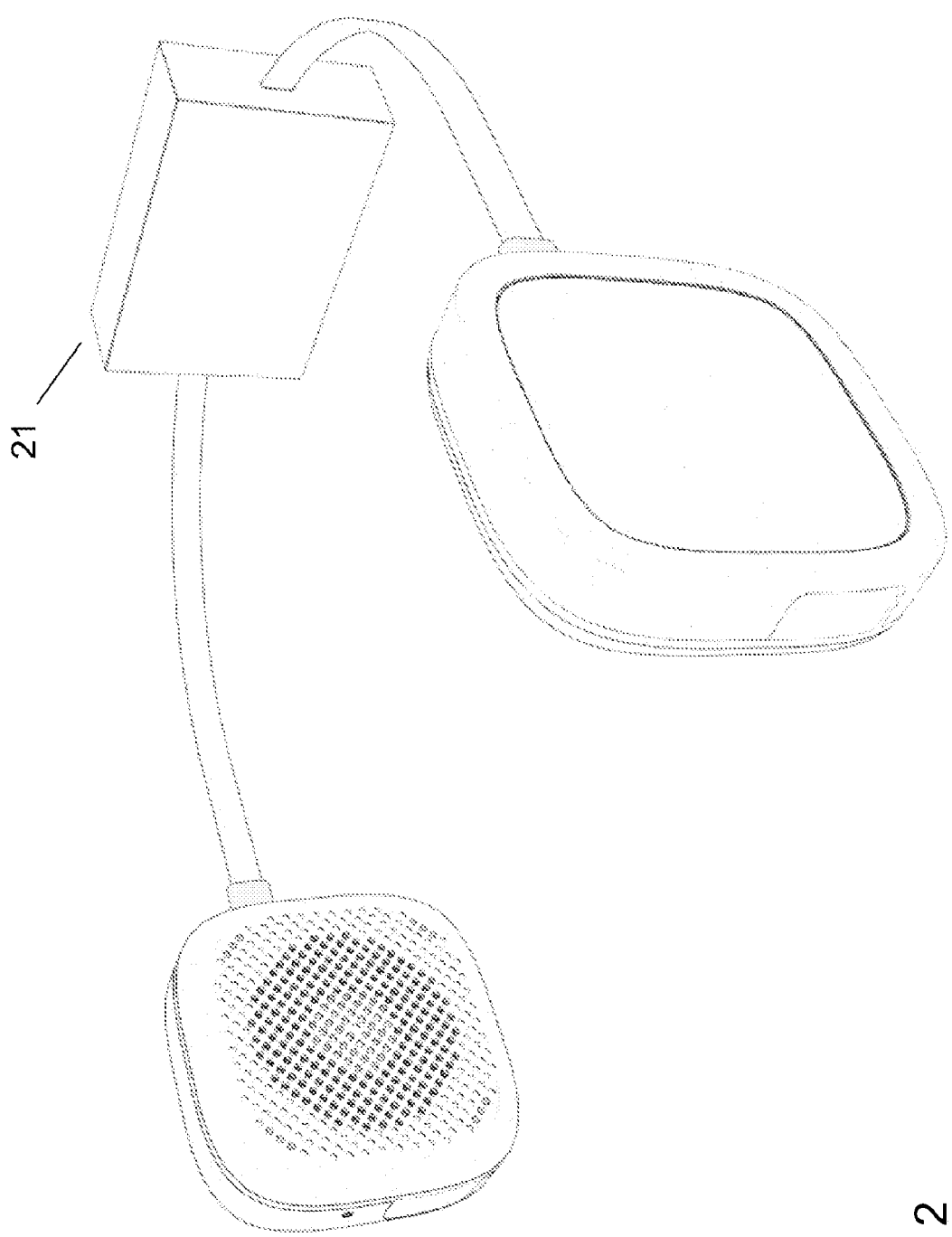
FIG. 2 shows another example of a headset device.

Alternatively, as shown in FIG. 2, a sub-module (21) can be located outside these enclosures as well. In this case the sub-module includes electronics such as battery, communication modules, GPS module, any sensors or any other electronics. The sub-module may be centrally located along the cable within the pair of headphones. Examples of advantages of having a sub-module housing electronics outside the two headphones enclosure are easy charging access and a more balanced weight distribution of the headset. The sub-module may also work wirelessly and may be mounted inside the helmet or attached or clipped on the exterior of the helmet.

Figure 3:
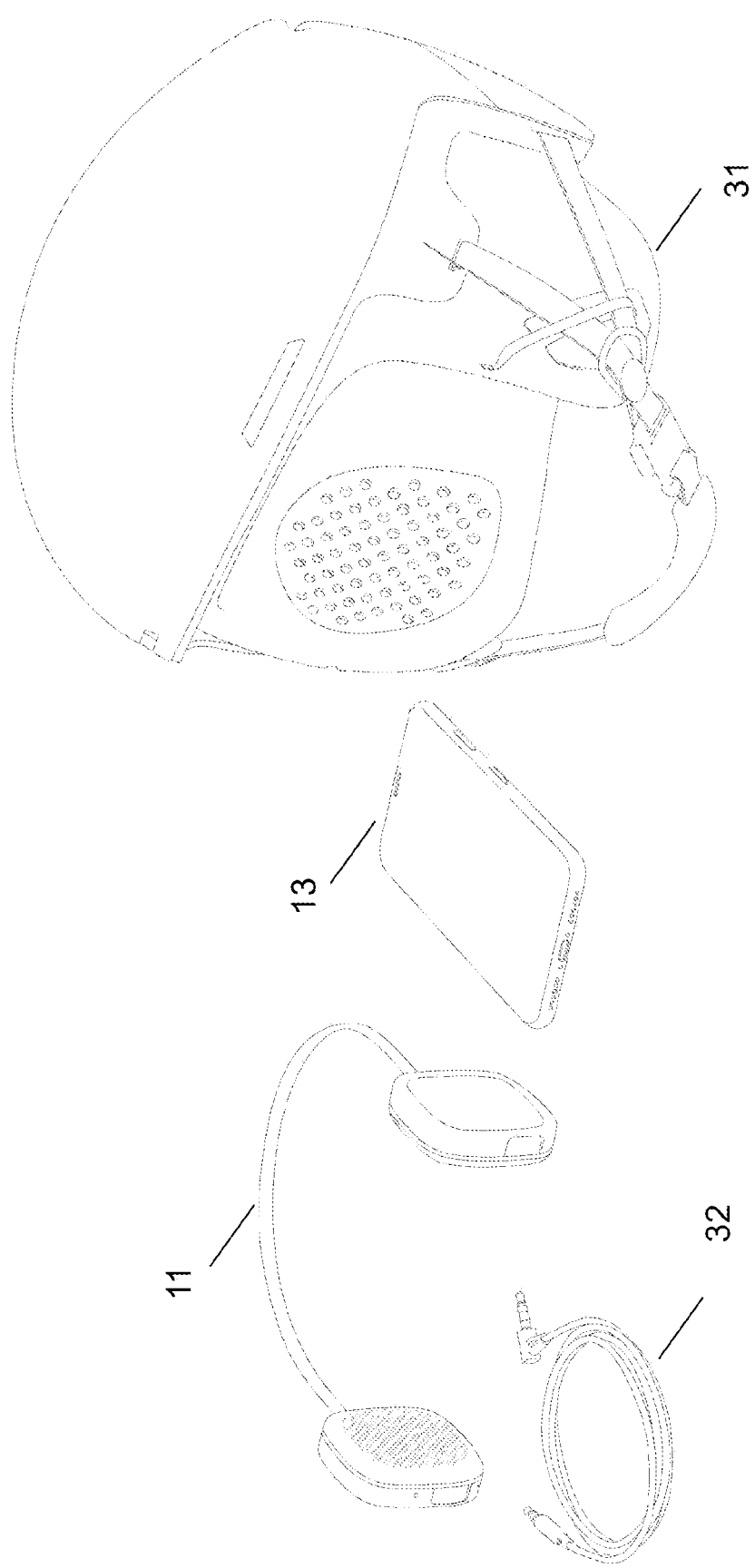
FIG. 3 shows another implementation of the headset system.

With reference to FIG. 3, the set of headphones can be installed inside sports helmets (31). The headphones have a thin profile and are shaped to fit in any sports helmet including ear pads. The headphones can also be set up for wired use, via a standard 3.5 mm audio cable (32) plugged into an external audio source of any connected personal device.

Figure 4:
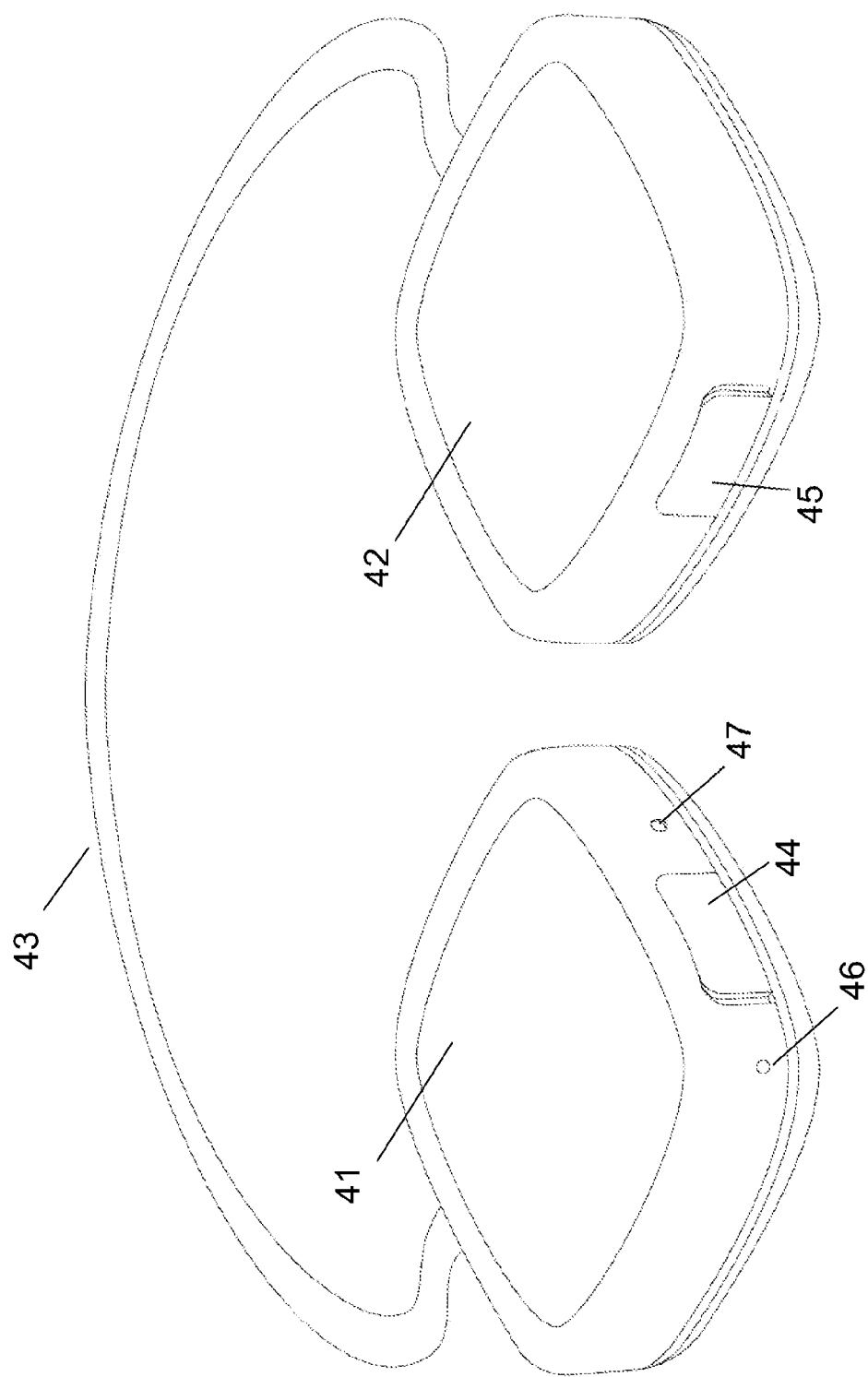
FIG. 4 shows a headset including a pair of headphones.

With reference to FIG. 4, the headset includes a pair of headphones (31,32) connected via a flexible cable (43). The cable (43) is flexible enough to be positioned discreetly within the user's helmet (31) and can be manipulated to easily fit within the ear padding and neck roll of a helmet such as a ski helmet.

The cable is either interchangeable or permanently fixed depending on the use case. Flexible to fit in the neck roll of a ski helmet. A rigid wire can be manipulated to position the ear modules over the user's ears as per their preference. A rigid cable may also be mounted onto any helmet via one or more clips. Hence, the wire could be a rigid but flexible wire that connects both ear modules and clips in to provide rigidity and structural integrity. It may comprise mouldable goosenecks overmoulded with silicone. The data/power/antenna cables that run between both headphones will be housed within a rigid unit sandwiched between the goosenecks.

A rigid cable may also be used to attach the headphones to helmets that do not necessarily have soft ear pads such as but not limited to a road bike helmet. Clips are intended to be placed in the most convenient place on a user's helmet. This is due to the fact that helmets come in all shapes and sizes. A gooseneck will fit into these clips to attach and stay sturdy on the helmet. The clips are fully removable.

Alternatively, the headphones may also be connected wirelessly without the need of the cable (43).

The headphones include large button pads (41,42) on the rear surface configured to be easily activated (for example tapped pressed or held) with or without gloves. When inserted inside a helmet including audio pouches, the large surface area of the button pads is also glove friendly with the pads being easily activated through the audio pouch with gloves, even with very bulky winter gloves. The button pad may cover the entire surface of the headphones.

Alternatively, the headphones may also include a control interface including more than two buttons. For example, a button on one side (e.g. a communication button) and three buttons on the other side (e.g. play/pause, volume up, volume down).

Hence the headset system can be easily controlled without direct access to either the pair of headphones or the connected device.

The headphones include two ports:
1. One micro USB port for charging the headset (44).
2. One 3.5 mm audio cable for connection to external audio sources (45).

The headphones may operate on a rechargeable battery providing long battery life and ease of use. Additional power source may also be provided and located on the exterior of the helmet, which may be capable of recharging the rechargeable battery.

The charging point has a silicone insert, with rubber seal to ensure water and dust proof for different environment.

The USB input may have a number of functions. Whilst it will be the point at which to charge the device, the user may also plug in external boom microphones, portable charging units etc. etc.

The headset system include a microphone apparatus such that the end-user can be heard while wearing the headset system, and to enable the user to input voice command via a voice assistant.

This enables the user to make and receive voice calls directly from the headset. Additionally, the microphone doubles as the microphone for the communications system enabled by the connected application. A microphone (46) is shown that is integrated into the right hand side of the headset.

The headphones may also include one or more visual indicator, such as a LED indicator (47), for providing status feedback to the user, such as, but not limited to: on/off status, wireless connection established, Bluetooth® pairing mode, or battery level indicator.

The operating parameters or features of the headset system may be controlled or altered via a simple 2-button interface provided by the button pads on the headphones. The functions may be altered by combining one or more of pressing, holding or tapping.

Examples of controlling the operating parameters of the headset system include one or more the following:
Play Button Functions (Right hand button)
  Double tap to skip track forwards
  Triple tap to skip track backwards
  Tap once to play/pause
  Tap once to answer/end call
  Press and hold for 1 second for voice assistant
  Press and hold for 4 seconds to power on
  Press and hold for 8 seconds to power off
Communication (Comms) Button Functions (Left hand button)
  Tap once to engage communications
  Tap again to end communications
  Press and hold to cycle through volume level.

Further controlling of the operating parameters may include for example, press and hold to decline a call session, double tap to skip a track forward when music is playing, or a triple tap to skip back a track.

Additionally, the operating parameters or features of the headset system are also controlled or altered via voice control, without needing to use the simple 2-button user interface. For example, control of the headset system is initiated using any available voice assistant such as Apple's Siri or Google Assistant.

Figure 5:
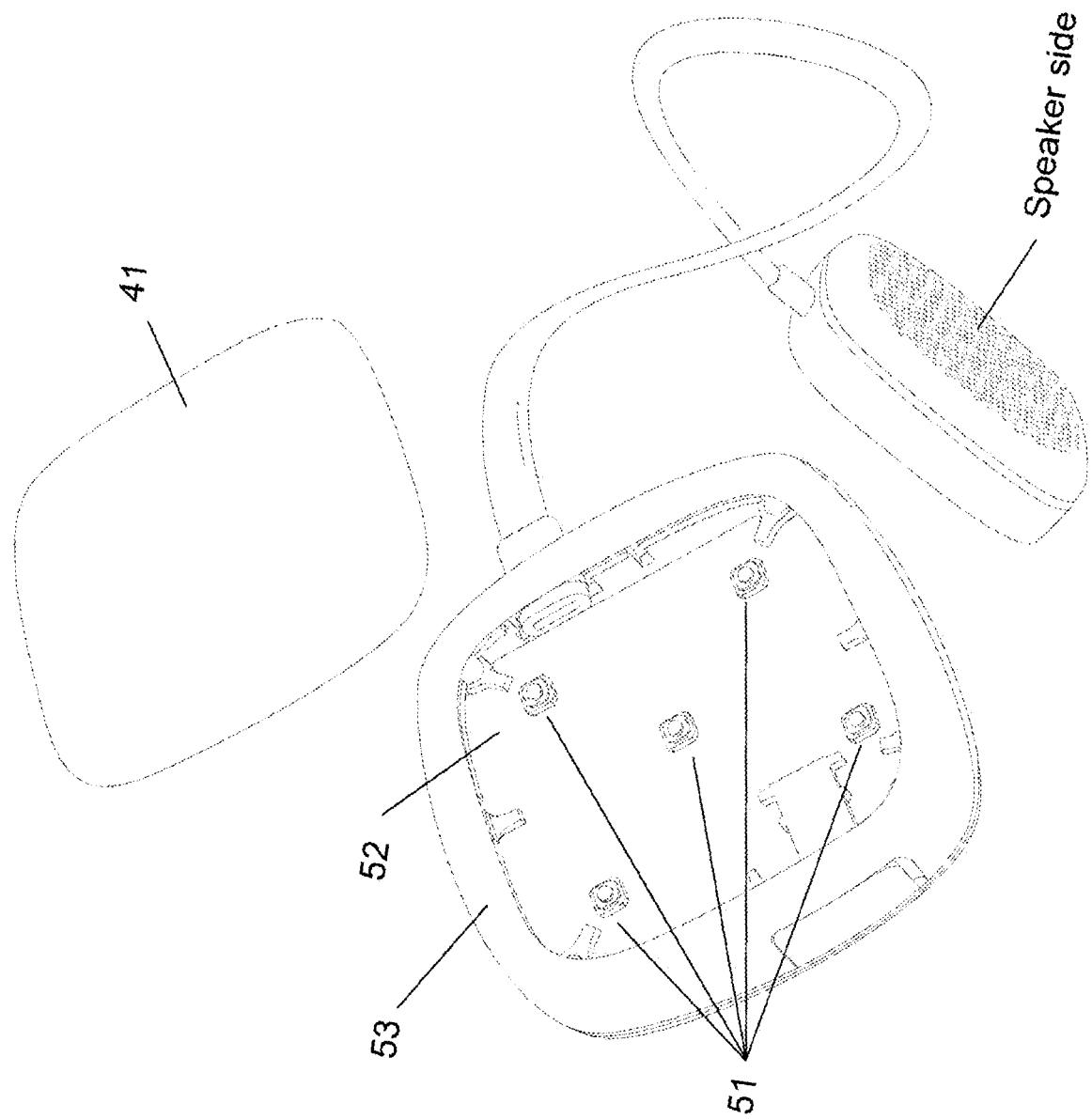
FIG. 5 shows an exploded view of one of the headphone.

With reference to FIG. 5, an exploded view of the rear surface of one of the headphone is shown. Whilst the rear surface on each headphone consists of one large button pad (41), there are five, individual, subsurface buttons on each side of the headphones (51) which are connected to a circuit board (52) and activated by a single large button pad (41). Any combination of these subsurface buttons can be pressed/activated in order to perform various functions. This is advantageous to the user as it minimises error/false positives when trying to activate certain functions listed in the features below. The end-user is thus able to tap any point located on the surface of the button pad in order to active it. Furthermore, the surface of the large button pads are advantageously concave in shape, hence directing the user's intended action towards the centre of the button pad surface. This design is further intended to benefit the user by minimising the effort required to activate any of the 5, subsurface buttons. The button pad (41) provides a substantially continuous contour with the outer edge or rim of the headphone (53), together providing a substantially flat surface. The button pad may be activated by pressing substantially anywhere on the rear surface of the headphone.

Figure 6:
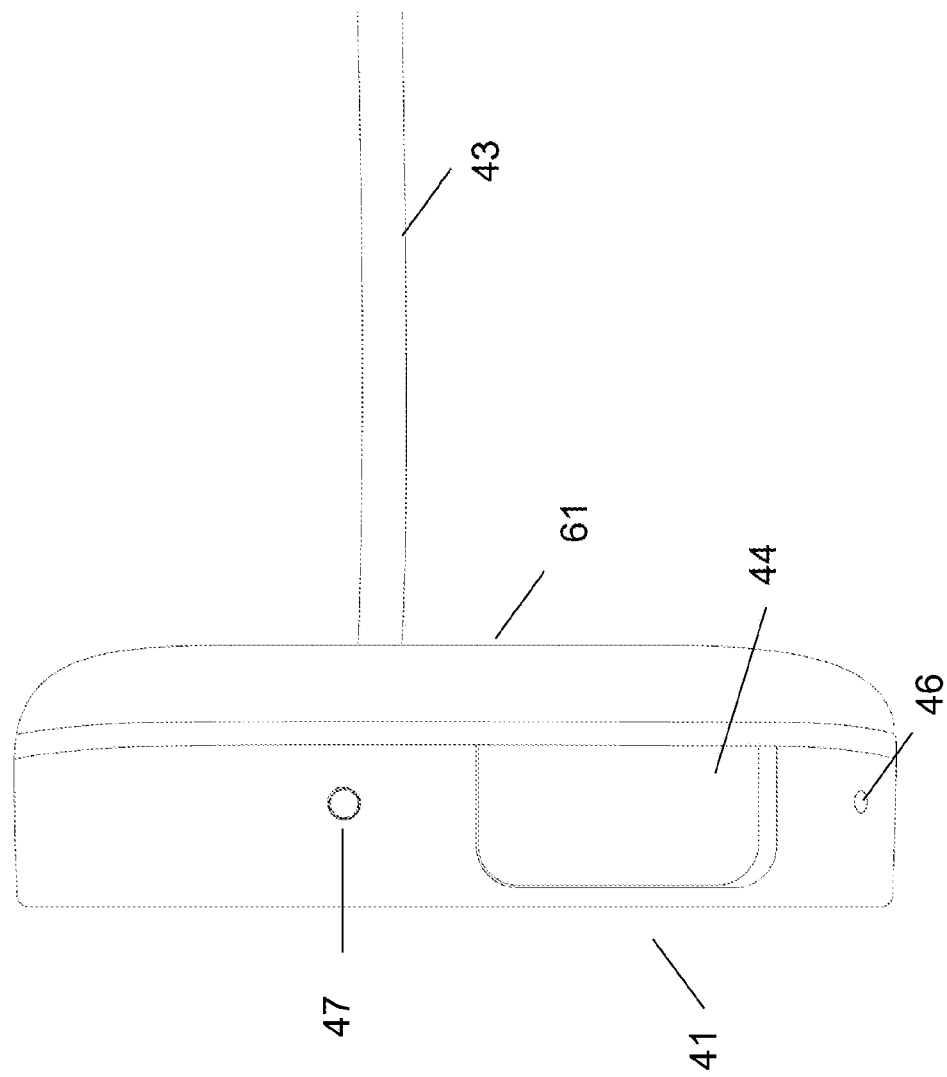
FIG. 6 shows a side view of one of the headphone.

FIG. 6 shows a side view of a headphone. Each headphone has a rear surface including the large button pad (41). Each headphone has a front surface (61) including the speaker that is configured to be directed, in use, toward the head of the user, so as to provide audio to the user.

The headphones rear surface and front surface each have a generally flat square shape and are generally parallel from one another.

Each headphone has a thin profile with overall dimension of around 44 mm×44 mm and a thickness of less than 15 mm.

FIGS. 7 to 10 show examples of the user interface of the application, called the Aleck GO!™, running on a connected device.

The software application provides features or functions that are specific for using the headset device whilst performing an outdoor activity.

Aleck GO!™ is a software application for iOS and Android operating systems. Similar to popular messaging and communications applications such as WhatsApp, Facebook Messenger, Telegram etc. The Aleck Go!™ app allows users to create a group in which they can add other users and communicate directly with them. The Aleck GO!™ app enables instant, walkie-talkie style communication delivered over the cloud. Similar to a walkie-talkie, users press a software "Push to Talk" (PTT) button in order to initiate communications with their chosen group (71). All communications are protected by 256-bit encryption.

A group may be user-defined by entering or selecting a new member from the user's device contact list. Additionally, it is possible to join a group by scanning a QR code corresponding of an existing group.

The communication button on the Aleck 006™ headset (42, as shown in FIG. 4) always mirrors the software Push to Talk button i.e. wherever the software PTT button is displayed on the connected application, a tap of the communication button will engage communications as if it were the software button.

Figure 7:
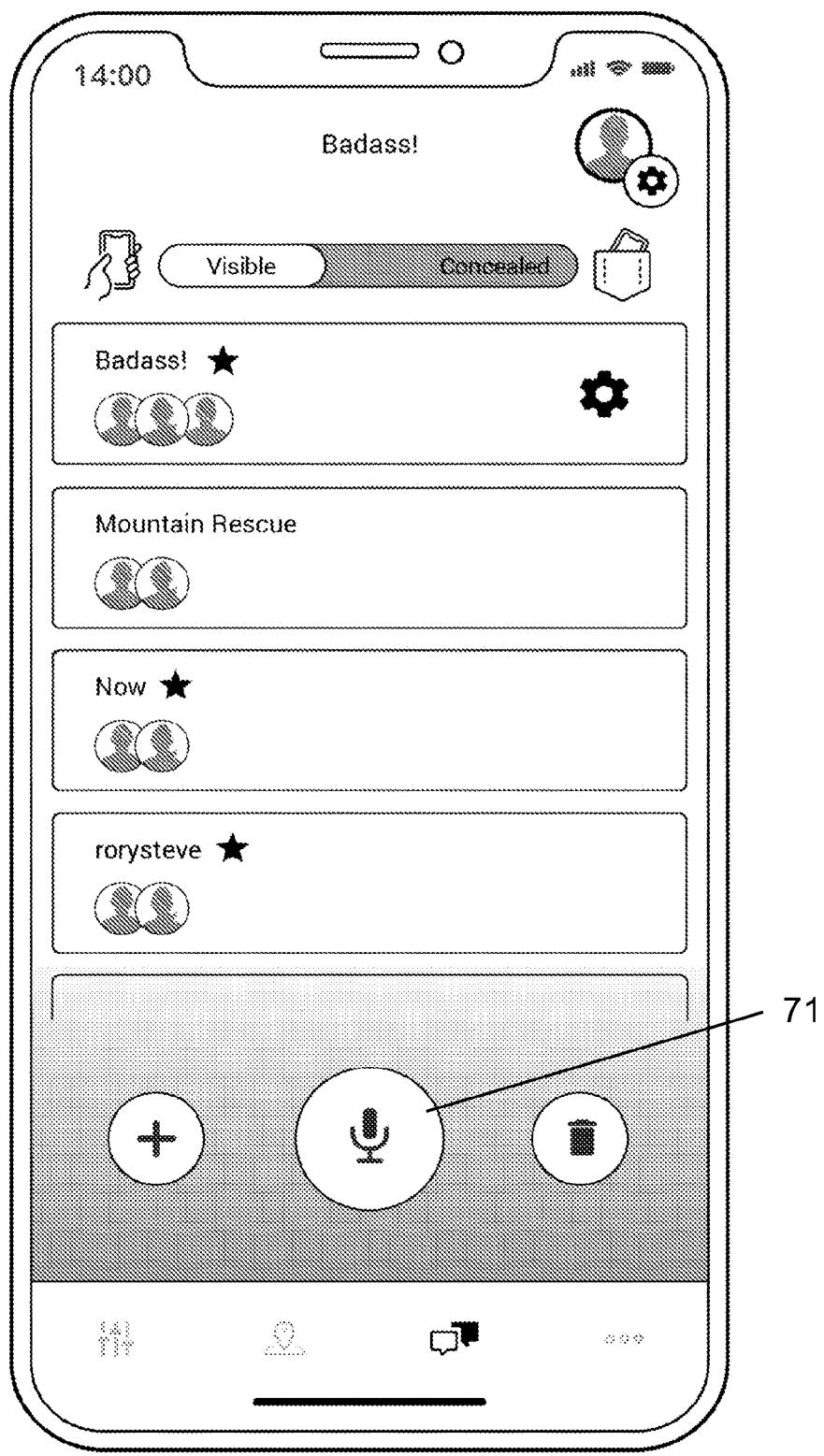
FIG. 7 shows an example of the user interface of the application running on a connected device.

When the application is launched for the first time, the user can create an account and is then presented with the groups page, as shown in FIG. 7. Within the groups page, users can manage various groups that they have created or are a member of. A group may be highlighted in a different color, such as green, to show the end-user which group is currently active.

Settings between the different groups may be user-defined, such as specific communication features.

The groups page displays a list of the different groups, with each group being arranged in rows extending across the width of the display, each row being vertically scrollable with a touch swipe up or down, to reveal other groups. Each row is being labeled with the name and/or an icon for a specific group, or an icon for each members of a specific group. The icon may also indicate if a specific group member is available with either visible or concealed mode activated.

The end-user is also able to select either visible mode or concealed mode:
  In visible mode: the connected device acts as normal;
  In concealed mode: the companion application makes the phone appear as locked by dimming the screen to a minimum brightness. This minimises drain on the battery of the connected device whilst keeping the application in the foreground so the communication feature works as intended whilst in a user's pocket.

The end-user may switch from visible mode to concealed mode by double tapping the screen or by sliding to visible mode. The brightness of the connected device will then automatically increase and the connected device returns to its original or default functionality.

The concealed mode enables the companion app to remain in the foreground of the connected device without draining the connected device battery life. This is useful when a connected device requires that the connected device cannot be in sleep mode when engaging audio recording or communication with a Bluetooth® accessory.

The groups page also displays an icon or menu to access a map page.

Figure 8:
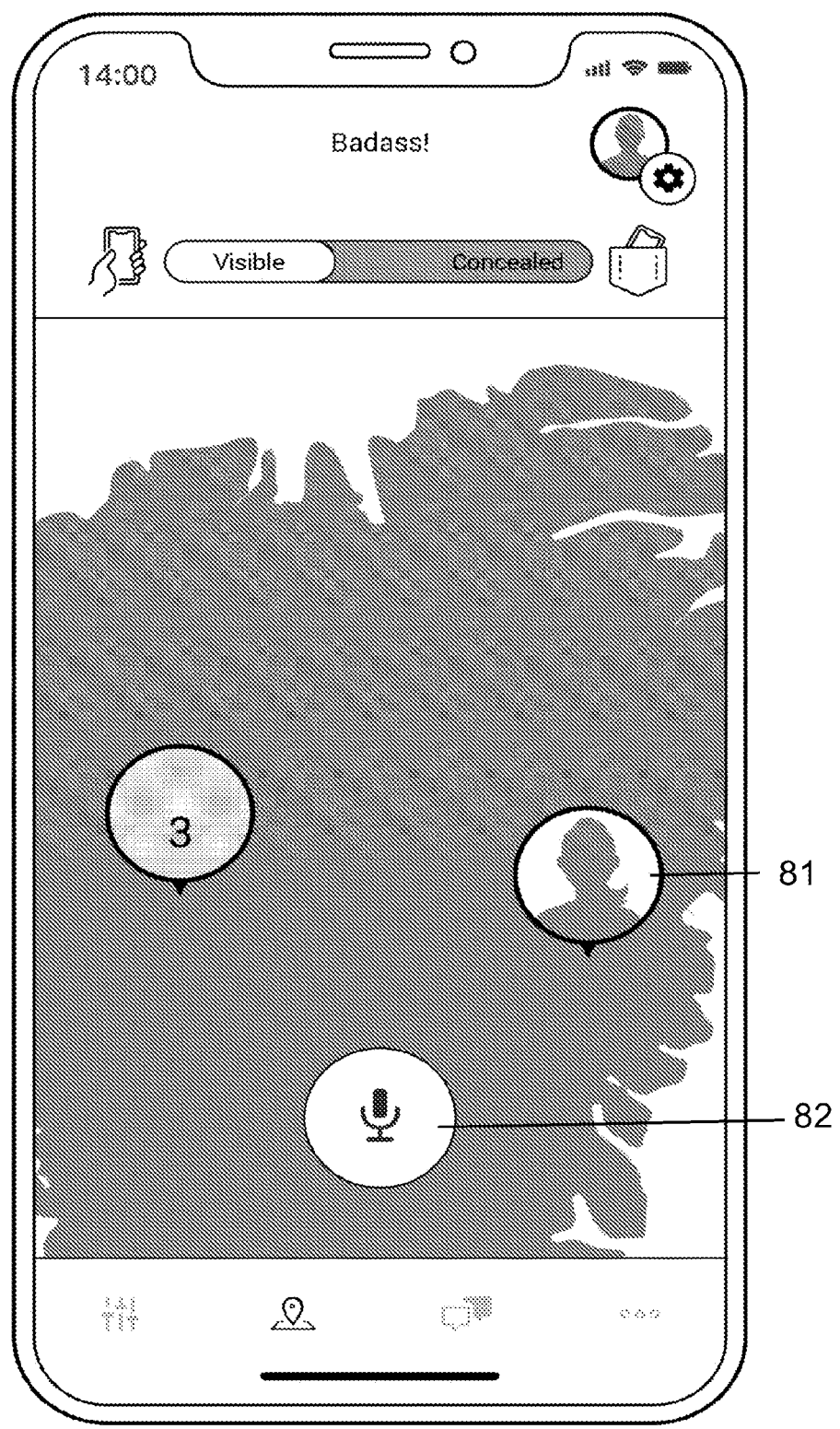
FIG. 8 shows an example of the user interface of the application running on a connected device.
Figure 9:
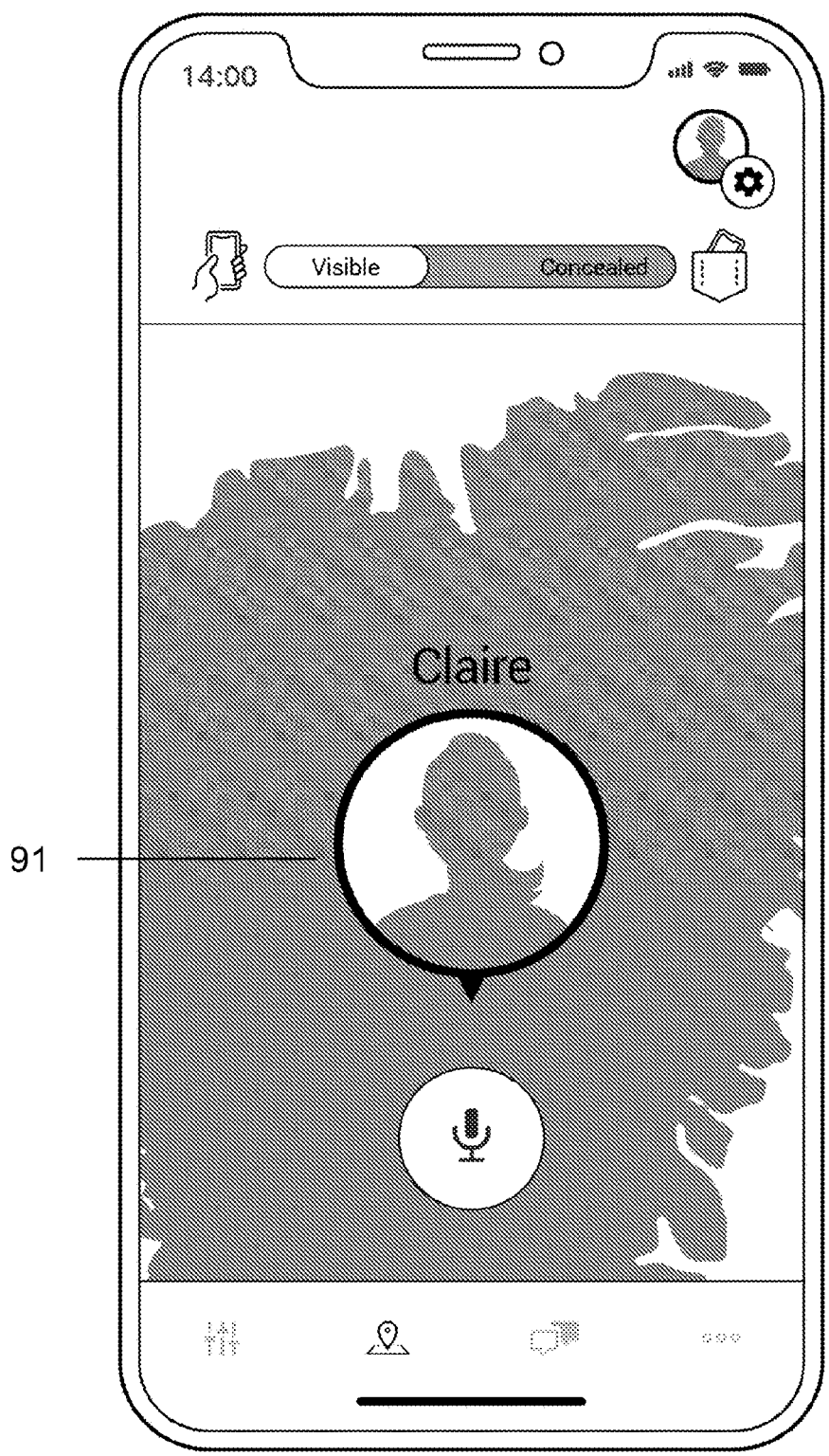
FIG. 9 shows an example of the user interface of the application running on a connected device.

FIGS. 8 and 9 show examples of a maps page, which allows the user to see exactly where the group members are located on a map. The headphones connect to a custom iOS and Android software application in order to enable direct communication and geolocation/mapping features with a custom group of people, as defined by the user.

By simply tapping on a selected user's icon, profile picture or avatar (81, 91), the user is able to speak to the selected user directly and only them. Tapping the PTT button (82) enables communication with the entire selected group again.

Figure 10:
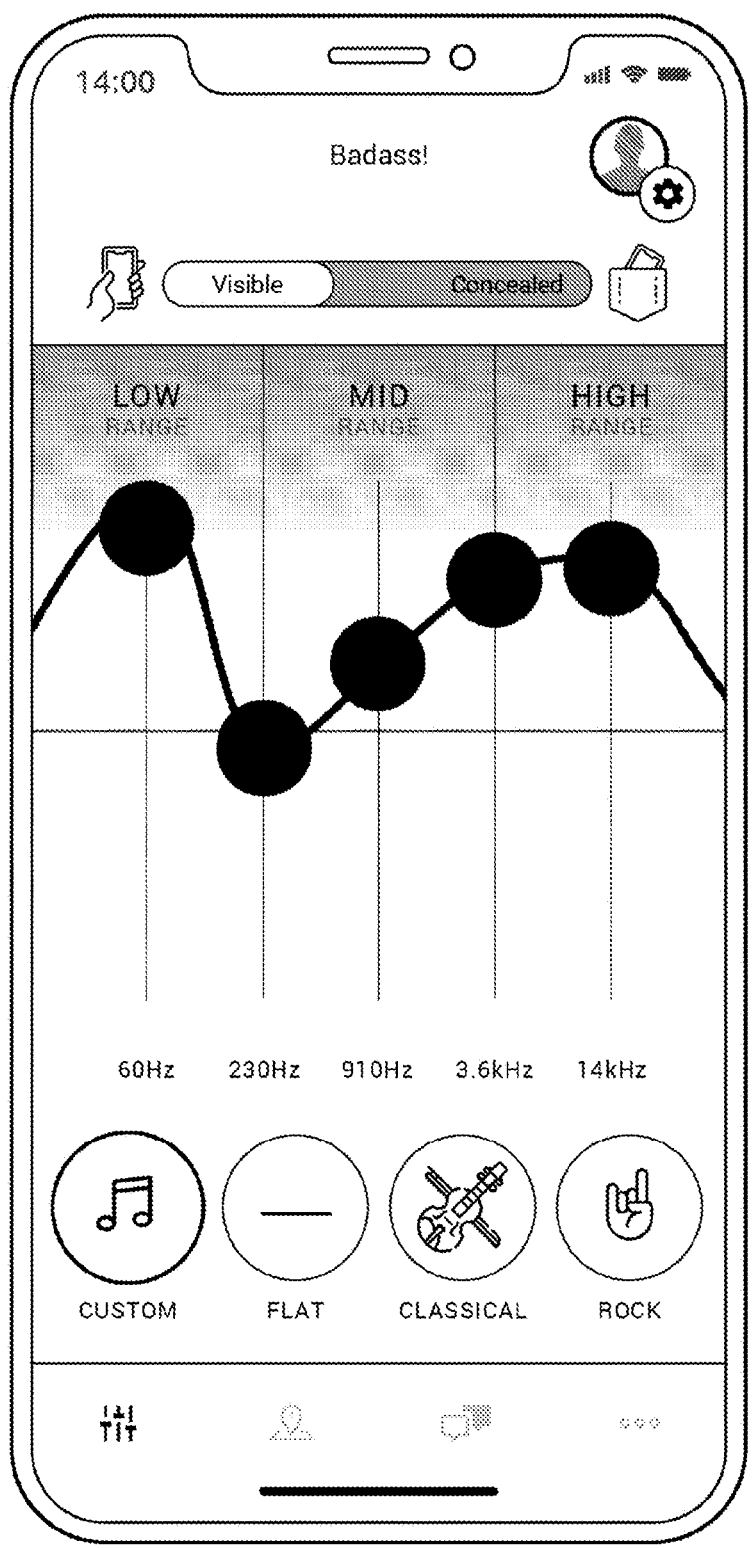
FIG. 10 shows an example of the user interface of the application running on a connected device.

As shown in FIG. 10, the Aleck Go!™ app enables users to adjust their headset's equaliser settings in real time. This means that users can customise the sound of their headset in order to suit their preferred sound profile e.g. more bass, less treble etc. Users also have the ability to select pre-programmed presets of equaliser settings.

Another implementation of the invention is now described, in which the headset system includes a Frequency Modulation (FM) module.

Frequency Modulation (FM) Feature

Additionally, the headset system also includes electronics with FM walkie talkie functionality (e.g. the electronics package includes at least an integrated FM chip e.g. which has the same or similar functionality as that in the PCT application WO2016181172A1). This allows users to communicate with one another and settings are controlled via the companion application or the control mechanism located on the headphones.

The headset or device may comprise a communication interface for short range wireless radio communications. The short range wireless radio may be configured to operate in accordance with the Bluetooth® protocol. The device may also comprise a communication interface that can be configured for frequency modulated (FM) communications on ultrahigh frequency (UHF) or very high frequency (VHF) frequency bands.

The communication button on one side of the headset system may for example deal with FM communication among unlimited users in a group.

The communication button will enable users to communicate with one another via FM, Bluetooth® or cloud based communications (but is not limited to this function). One touch of this button will enable instant communication with other users.

A communication interface is provided for direct two-way wireless communications with other users in the group. The communication interface operates on an unlicensed frequency band. The communication interface can comprise a radio unit configured for FM (frequency modulated) communications, for example on 400-480 MHz UHF (ultra high frequency) band where unlicensed two-radio is permitted in the majority of territories around the world. Unlicensed radio applications can also be permitted in the VHF (very high frequency) bands, and thus VHF capable radio can also be used for this purpose.

Normal walkie-talkies (e.g. FRS—US Family Radio Service) are analog (e.g. FM) and grab an entire channel for a single person who wants to speak and so are spectrally very inefficient. There are various initiatives to provide a digital equivalent to conventional, analog walkie-talkies, like D-STAR (packet-based, FDMA) and other digital two-way radios, like dPMR and eXRS (eXtreme Radio 10 Service—frequency hopping spread spectrum). But analog can still have advantages in terms of cost, simplicity and range. The approach here is to retain an analog carrier, but to automatically grab a channel only for the short duration that speech is being transmitted; the channel is then automatically released once the speech ends. Speech is buffered for a short space of time and scheduled for transmission only once a channel is made available. This increases the number of helmet users that can communicate over the channel and reduces the awkward silences that accompany normal manual channel grabbing and ungrabbing.

Another feature is the ability to have an open channel of communication whereby users can effectively talk over one another in normal conversation. i.e. you don't have to hold the push to talk button to communicate. This would be done by simply speaking into an open FM channel. This may be done via either FM or another short range mesh networking technology i.e. Bluetooth®, WiFi etc.

- The headset system or device has an integrated FM module that allows users to communicate via walkie talkie. There is a dedicated "push to talk" button located on the device.
- When the "push to talk" button is pressed, users are instantly connected to anyone on the same frequency as them.
- With safety in mind, FM functionality takes precedence over all other functions of the device, i.e. if a user listening to music and someone on their frequency presses their "push to talk" button, the user's music will automatically cut out so that said person can instantly be heard.
- This is an important safety feature as it means the user can be alerted to danger instantly over all other functionality.
- The device can connect to an unlimited amount of other devices such as Aleck 006™ devices, or wireless radio devices, at any one time (once assigned to the same group frequency).
- The FM communication transmission has a range of 3 km-5 km line of sight.
- Unlike other "walkie talkie" style systems that record a message, deliver it to a cloud server then play it on another user's device, the device connects users instantly with everyone in their group.

The whole device will be able to communicate with another small wireless device with an integrated button.

Alternatively, a small button device may be intended to act as a peripheral Push To Talk button that can be placed conveniently within a jacket, glove, ski pole, mounted to bike handle bars etc. This will allow the user to enable communications with other users without having to put their hand up to their ear to engage the push to talk.

When the button is pressed, it activates the "push to talk" remotely. This button may be programmed to perform a number of different functions such as but not limited to, volume control, play pause, etc. etc.

The software application may also be used to control further settings of the headset system, such as Bluetooth® connection and group frequency sharing.

Figure 11:
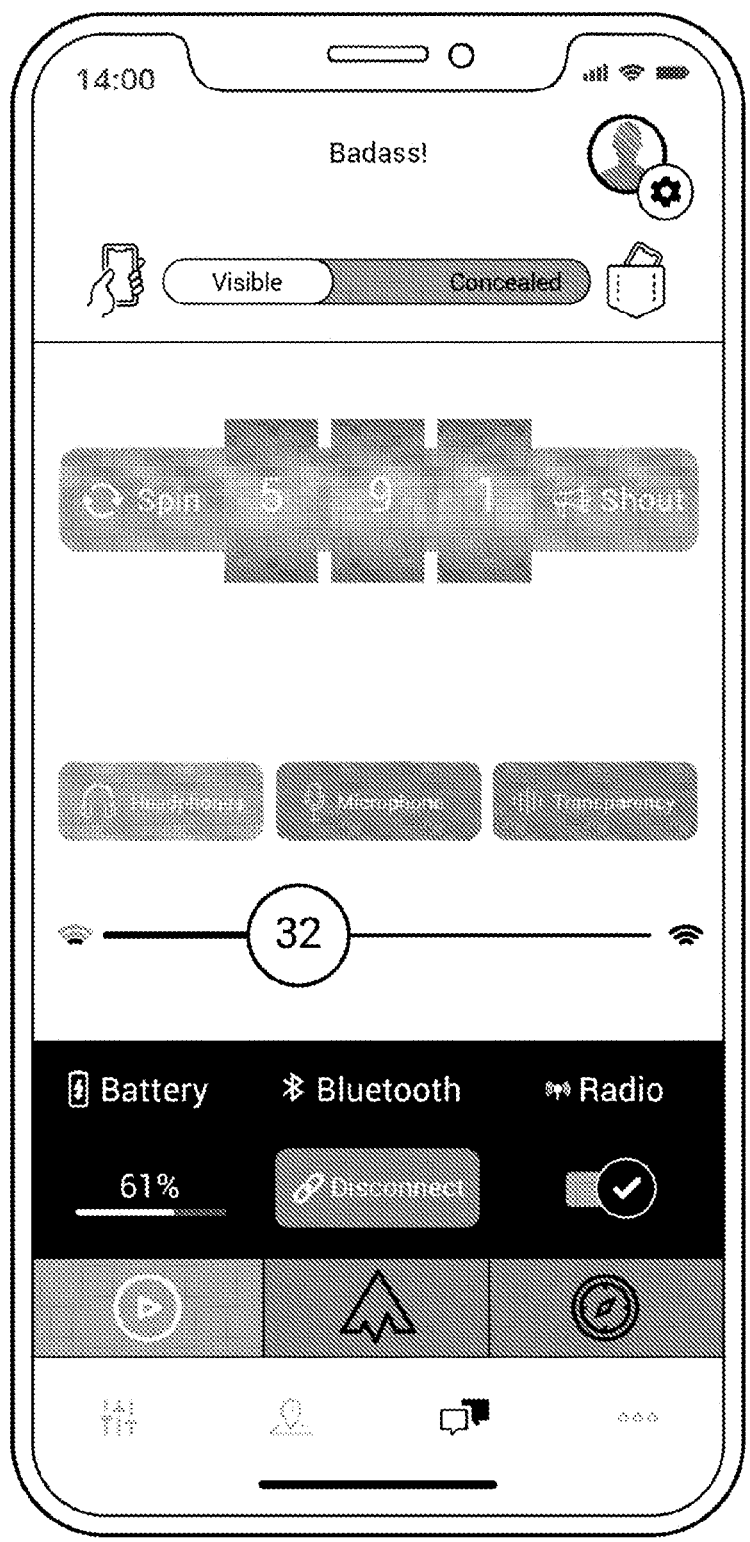
FIG. 11 shows an example of the user interface of the application running on a connected device.

The functions include but are not limited to the following:

- The app will show which device it is connected to; the user may edit the "Name" of the device.
- As shown in FIG. 11, random 'Spin' function is to spin the rollers, fruit machine style, and land on a non-typical human choice of code; the user can click to spin, and randomly generate a number (radio frequency) between 0 to 999, the "spin" function will use a look-up table to allocate and transpose the code to a specific radio frequency which can be determined by the user's GPS location, which is an allocated correct and legal radio frequency. The user can also manually select their geographical location.
- The rollers can be rotated by hand if the user prefers.
- Indication of "ripples": always-on radial 'ripples' whilst devices are connected.
- 'Shout' frequency codes across Bluetooth® for easy setting of all devices in a user's group. This is to allow the user to instantly connect to other people in the same group with the same radio frequency, rather than having to manually input the radio frequency, although the user is also allowed to do so.
- the volume of the "headphones", "microphone" and "sound transparency" can be selected and changed.
- the indication of the battery can be shown.
- radio on-off can be selected.
- When no devices are connected, the main page reverts to Bluetooth® connectivity page.
- GPS functionality can be enabled—with location, impact catalogue and timed runs etc, record all the impacts that a user has experienced in a particular area, for medical uses or ski patrol etc.
- Tutorials and manual can be linked through a button.
- 'Share to social media' options are also available here.

Sound transparency uses the inbuilt microphone to allow the outside environment to be played through the speakers. This is especially useful on a ski helmet where the speakers are embedded in the soft ear padding as it allows users to control the amount of outside environment they hear. It increases their spatial awareness.

Another way of selecting a radio frequency or an open radio frequency is cloud-based. The code search functionality can be enabled to ensure users do not end up on the same (or close) frequencies using Cloud services instead of FM scan. The functionality can be implemented through following steps:

1. Spin for a code
2. Code request and GPS location sent to cloud service
3. Cloud finds next unused, local, frequency-distant code
4. User code is guaranteed to be non-conflicting and clear
5. Spin 'magically' lands on received code
6. Cloud sends code to device.

The electronics may also include sensors, such as an inbuilt accelerometer, allowing for tracking and recording the amount of g force that the device experiences. This could be useful to the user as it would allow them to see how many impacts they have had.

Figure 12:
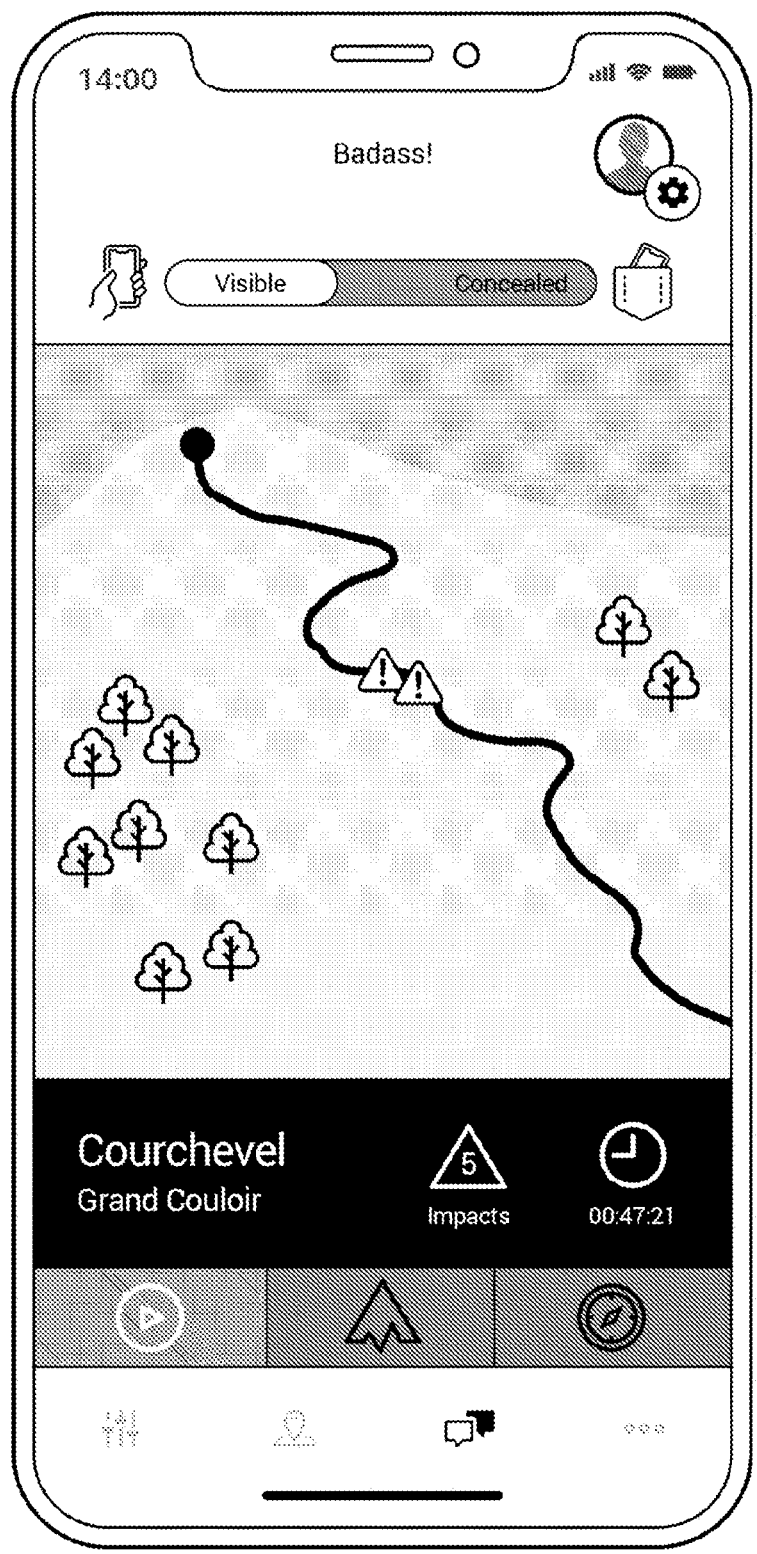
FIG. 12 shows an example of the user interface of the application running on a connected device.

As shown in FIG. 12, in this scenario, we can see that the impacts have been plotted on a mountain using the GPS from the users phone. The application displays a map of a recorded route and the number of impact recorded along the route are displayed and indicated by a symbol or icon, such as an exclamation mark. The total number of impacts are indicated. Tapping on an exclamation mark automatically displays information or parameters about the selected impact i.e. speed, g force, time etc.

An impact may be recorded only when a measured g force value is above a user-configurable threshold.

Monitoring the sensors values may have many other useful applications e.g. If a user has a dangerous impact (as registered by the accelerometer), then a warning could be broadcast to other members of the user's ski group, mountain rescue etc.

Summary of Key Concepts

Note that all Key Concepts A onwards can be combined with any other Key Concept B onwards; each Key Concept may be a novel concept. All 'Optional' features can be combined with any Key Concept A onwards and any other 'Optional' feature. Each 'Optional' feature may also be an independently novel concept.

A. Headset System for Establishing a Call Session Between a Plurality of Users Via a Single User Input without Having to Take the Helmet Off or Handling the Connected Device A headset system for establishing a call session between a selected plurality of users, the headset system comprising:
(a) a pair of headphones worn by an end-user, and providing audio features for the end-user, the pair of headphones shaped to substantially fit inside a helmet,
(b) a companion application running on a connected device and connected to the pair of headphones, in which the companion application is configured to set up a group consisting of a selected plurality of users;
in which the end-user, via a single user input, is able to establish a call session through the connected device between the selected plurality of users without having to take the helmet off and without handling the connected device.

Optional Features:
Establishing the call session refers to either initiating the call session or answering the call session initiated by another user.
Headset system comprises a voice activation sub-system in order to establish the call session.
Single user input includes voice command.
Pair of headphones includes a user interface comprising at least one control mechanism, such as a switch.
Single user input includes activating the control mechanism accessible by the end-user from the exterior of the helmet.
Control mechanism is glove friendly.
Control mechanism is a button or touch pad that is activated by being pressed, tapped or held.
Control mechanism further controls the connected device in order to receive audio media from the connected device.
Button or touch pad is operable with gloves from the exterior of the helmet.
Selected plurality of users consists of a selected subset of a contacts list stored in the connected device.
Call session between the selected plurality of users is encrypted.
The headphones include a wireless communication module, such that the headphones are wirelessly connected to the end-user's connected device via a wireless protocol, such as Bluetooth®.
The headphones are sized to be inserted within ear pouches of the helmet.
The headphones rear surface and front surface each have a generally flat square shape and are generally parallel from one another.
A speaker apparatus is mounted near or on the front surface of each headphone.
The headphones are connected with one another via a flexible cable that is shaped to fit inside the helmet.
Connected device is a smartphone, tablet, music player, smart watch or smart ring.
Headset system comprises a helmet, such as a bicycle, roller skating, skateboarding, snow boarding or skiing helmet.

B. Headset System Including a Helmet Attachable Pair of Headphones and a Companion App Displaying a Visual Map with the Location of a Selected Plurality of Users.

A headset system comprising:
(a) a pair of headphones worn by an end-user, and providing audio features for the end-user, the pair of headphones shaped to substantially fit inside a helmet,
(b) a companion application running on a connected device and connected to the pair of headphones, in which the companion application is configured to set up a group consisting of a selected plurality of users;
and in which the companion application provides the end-user with an interface module configured to display a visual map indicating the location of the selected plurality of users, based on the geo-location of the plurality of users.

Optional Features:
Interface module automatically displays the visual map.
Interface module is configured to receive end-user settings for audio and/or communication features.
User settings comprise at least one of: volume level, volume levels for particular audio frequencies, audio levels, sound filters, ambient noise cancellation parameters.
User settings may be set differently for audio and communication features.
Communication features include a concealed device mode to maintain communication with the selected plurality of users even when the end-user is not handling or holding the connected device.
The companion application is configured to set up multiple groups consisting of a selected plurality of users.
The interface module includes a push to talk button that the end-user is able to press in order to establish a call session between one or more of the groups.

The visual map includes a push to talk button that the end-user is able to press in order to establish a call session between the selected plurality of users that are on the map.

The visual map is updated in real-time or near real-time based on the received geo-location of the selected plurality of users.

The visual map is configured to display an icon of each selected plurality of users.

Tapping the icon enables the end-user to directly establish a call session with only the selected user associated with the icon.

The icon is a picture or avatar.

C. Headset System Including a Helmet Attachable Pair of Headphones Including a Simple 2-Button Control Interface that is Accessible, in Use, from the Exterior of the Helmet.

A headset system comprising:
  (a) a pair of headphones worn by an end-user, and providing audio features for the end-user, the pair of headphones shaped to substantially fit inside a helmet, in which the pair of headphones include a control interface for controlling or altering the operating parameters of the system,
  (b) a companion application running on a connected device and connected to the pair of headphones, in which the companion application is used for setting up a group consisting of a selected plurality of users;
  and in which the control interface includes only two control mechanisms that are accessible, in use, from the exterior of the helmet.

Optional Features:
  Each headphone has a rear surface that is shaped, in use, to face away from the user, in which the control mechanisms form a substantial part of the rear surface of each headphone.
  One control mechanism controls or alters an audio source of the connected device.
  One control mechanism controls or alters voice communication with the selected plurality of users.
  The control mechanisms are each accessible, in use, from one side of the helmet.
  The control mechanisms are activated by any combination of the following: being pressed, tapped or held.
  Each control mechanisms includes a touch or button pad with a concave shape.
  Touch or button pad is at least 40 mm×40 mm.
  Each control mechanism further includes multiple subsurface switches located directly underneath the touch or button pad.
  The multiple subsurface switches are connected or coupled together via a circuit board and activated by the touch or button pad.
  Operating parameters of the system include: audio source, voice communication or voice assistant features.

D. Headset System for Establishing a Call Session Between a Plurality of Users Using Either Cloud-Based, Mesh Bluetooth or FM Communication Features.

A headset system for establishing a call session between a selected plurality of users, the headset system comprising:
  (a) a pair of headphones worn by an end-user, and providing audio features for the end-user;
  (b) a companion application running on a connected device and connected to the pair of headphones, in which the companion application is configured to set up a group consisting of a selected plurality of users;
  in which the system is configured to establish a call session between the end-user and the selected plurality of users using either cloud-based, mesh Bluetooth or FM communication features.

Optional Features:
  The system is configured to automatically select either cloud-based, mesh Bluetooth or FM communication.
  The selection of either cloud-based, mesh Bluetooth or FM communication is user configurable.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A headset system for establishing a call session between a selected plurality of users, the headset system comprising:
  (a) a pair of headphones worn by an end-user, and providing audio features for the end-user, the pair of headphones shaped to substantially fit inside a helmet,
  (b) a companion application running on a connected device and connected to the pair of headphones, in which the companion application is configured to set up a group consisting of a selected plurality of users;
  in which the end-user, via a single user input, is able to establish a call session through the connected device between the selected plurality of users without having to take the helmet off and without handling the connected device.

2. The headset system of claim 1 in which establishing the call session refers to either initiating the call session or answering the call session initiated by another user.

3. The headset system of claim 1 in which the headset system comprises a voice activation sub-system in order to establish the call session.

4. The headset system of claim 1 in which the single user input includes voice command.

5. The headset system of claim 1 in which the pair of headphones includes a user interface comprising at least one control mechanism, such as a switch.

6. The headset system of claim 1 in which the single user input includes activating the control mechanism accessible by the end-user from the exterior of the helmet.

7. The headset system of claim 5 in which the control mechanism is glove friendly.

8. The headset system of claim 5 in which the control mechanism is a button or touch pad that is activated by being pressed, tapped or held.

9. The headset system of claim 5 in which the control mechanism further controls the connected device in order to receive audio media from the connected device.

10. The headset system of claim 5 in which the control mechanism is operable with gloves from the exterior of the helmet.

11. The headset system of claim 1 in which the selected plurality of users consists of a selected subset of a contacts list stored in the connected device.

12. The headset system of claim 1 in which the call session between the selected plurality of users is encrypted.

13. The headset system of claim 1 in which the headphones include a wireless communication module, such that the headphones are wirelessly connected to the end-user's connected device via a wireless protocol, such as BLUETOOTH.

14. The headset system of claim 1 in which the headphones are shaped to be inserted within ear pouches of the helmet.

15. The headset system of claim 1 in which the headphones rear surface and front surface each have a generally flat square shape and are generally parallel from one another.

16. The headset system of claim 1 in which a speaker apparatus is mounted near or on the front surface of each headphone.

17. The headset system of claim 1 in which the headphones are connected with one another via a flexible cable that is shaped to fit substantially inside the helmet.

18. The headset system of claim 1 in which the companion application provides the end-user with an interface module configured to display a visual map indicating the location of the selected plurality of users, based on the geo-location of the plurality of users.

19. The headset system of claim 18 in which the interface module automatically displays the visual map.

20. The headset system of claim 18 in which the interface module is configured to receive end-user settings for audio and/or communication features.

21. The headset system of claim 20 in which the user settings comprise at least one of: volume level, volume levels for particular audio frequencies, audio levels, sound filters, ambient noise cancellation parameters.

22. The headset system of claim 20 in which the user settings may be set differently for audio and communication features.

23. The headset system of claim 22 in which the communication features include a concealed device mode to maintain communication with the selected plurality of users even when the end-user is not handling or holding the connected device.

24. The headset system of claim 1 in which the companion application is configured to set up multiple groups consisting of a selected plurality of users.

25. The headset system of claim 18 in which the interface module includes a push to talk button that the end-user is able to press in order to establish a call session between one or more of the groups.

26. The headset system of claim 18 in which the visual map includes a push to talk button that the end-user is able to press in order to establish a call session between the selected plurality of users that are on the map.

27. The headset system of claim 18 in which the visual map is updated in real-time or near real-time based on the geo-location of the selected plurality of users.

28. The headset system of claim 18 in which the visual map is configured to display an icon of each selected plurality of users.

29. The headset system of claim 28 in which tapping an icon enables the end-user to directly establish a call session with only the selected user associated with the icon.

30. The headset system of claim 28 in which the icon is a picture or avatar.

31. The headset system of claim 1 in which the pair of headphones include a control interface for controlling or altering operating parameters of the system, and in which the control interface includes only two control mechanisms that are accessible, in use, from the exterior of the helmet.

32. The headset system of claim 31 in which each headphone has a rear surface that is shaped, in use, to face away from the user, in which the control mechanisms form a substantial part of the rear surface of each headphone.

33. The headset system of claim 31 in which one control mechanism controls or alters an audio source of the connected device.

34. The headset system of claim 31 in which one control mechanism controls or alters voice communication with the selected plurality of users.

35. The headset system of claim 31 in which the control mechanisms are each accessible, in use, from one side of the helmet.

36. The headset system of claim 31 in which the control mechanisms are activated by any combination of the following: being pressed, tapped or held.

37. The headset system of claim 31 in which each control mechanisms includes a touch or button pad with a concave shape.

38. The headset system of claim 37 in which the touch or button pad is at least 40 mm×40 mm.

39. The headset system of claim 1 in which the thickness of each headphone is less than 15 mm.

40. The headset system of claim 31 in which each control mechanism further includes multiple subsurface switches located directly underneath a touch or button pad.

41. The headset system of claim 40 in which the multiple subsurface switches are connected or coupled together via a circuit board and activated by the touch or button pad.

42. The headset system of claim 1 in which operating parameters of the system include: audio source, voice communication or voice assistant features.

43. The headset system of claim 1 in which the connected device is a smartphone, tablet, music player, smart watch or smart ring.

44. The headset system of claim 1 in which the headset system comprises a helmet, such as a bicycle, roller skating, skateboarding, snow boarding or skiing helmet.

45. The headset system of claim 1 in which the system is configured to establish a call session between the end-user and the selected plurality of users using either cloud-based, mesh BLUETOOTH or FM communication.

46. The headset system of claim 1 in which the system is configured to automatically select either cloud-based, mesh BLUETOOTH or FM communication.

47. The headset system of claim 46 in which the selection of either cloud-based, mesh BLUETOOTH or FM communication is user configurable.

\* \* \* \* \*